United States Patent
Yano

(10) Patent No.: US 11,731,658 B2
(45) Date of Patent: Aug. 22, 2023

(54) VEHICLE CONTROL METHOD AND CONTROL DEVICE

(71) Applicant: Nissan Motor Co., Ltd., Yokohama (JP)

(72) Inventor: Hirofumi Yano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 65 days.

(21) Appl. No.: 16/769,623

(22) PCT Filed: Dec. 5, 2017

(86) PCT No.: PCT/JP2017/043586
§ 371 (c)(1),
(2) Date: Jun. 4, 2020

(87) PCT Pub. No.: WO2019/111309
PCT Pub. Date: Jun. 13, 2019

(65) Prior Publication Data
US 2020/0317224 A1    Oct. 8, 2020

(51) Int. Cl.
*B60W 60/00*    (2020.01)
(52) U.S. Cl.
CPC ..... *B60W 60/0025* (2020.02); *B60W 2420/42* (2013.01); *B60W 2554/402* (2020.02);
(Continued)
(58) Field of Classification Search
CPC ....... B60W 60/0025; B60W 2554/402; B60W 2555/06; B60W 2554/404; B60W 2554/80; B60W 2420/42
See application file for complete search history.

(56) References Cited

U.S. PATENT DOCUMENTS 9,501,929 B2    11/2016  Sugawara
2009/0309972 A1*  12/2009  Tonokawa ........... G07C 5/0866
                                          348/148
(Continued)

FOREIGN PATENT DOCUMENTS

CN          106233355 A      12/2016
EP          3 168 823 A1      5/2017
(Continued)

*Primary Examiner* — Jelani A Smith
*Assistant Examiner* — Toya Pettiegrew
(74) *Attorney, Agent, or Firm* — Global IP Counselors, LLP

(57) ABSTRACT

A vehicle control device or method controls an output of a drive source of a vehicle based on a color of an illuminated signal of a traffic light in a vehicle-advancing direction during travel in autonomous driving. The vehicle control device includes a control unit that estimates the color of the currently illuminated signal of the traffic light based on oncoming vehicle information and controls the output of the drive source based on an estimation result when the color of the illuminated signal of the traffic light cannot be acquired by the onboard camera. The control unit limits the output of the drive source and reduces a vehicle speed from a current vehicle speed to a vehicle speed at which fuel efficiency is superior to that at the current vehicle speed when the color of the illuminated signal of the traffic light is estimated to be red.

6 Claims, 6 Drawing Sheets

(52) U.S. Cl.
CPC ... *B60W 2554/404* (2020.02); *B60W 2554/80* (2020.02); *B60W 2555/60* (2020.02)

(56) References Cited

U.S. PATENT DOCUMENTS

| | | | |
|---|---|---|---|
| 2011/0095909 A1* | 4/2011 | Kushi | G08G 1/161 |
| | | | 340/905 |
| 2013/0325241 A1* | 12/2013 | Lombrozo | G06V 20/584 |
| | | | 701/23 |
| 2015/0371097 A1* | 12/2015 | Park | H04N 23/743 |
| | | | 382/104 |
| 2017/0072962 A1 | 3/2017 | Meyer et al. | |
| 2017/0297567 A1* | 10/2017 | Matsumura | B60W 40/08 |
| 2017/0316273 A1 | 11/2017 | Ferguson et al. | |
| 2017/0356747 A1* | 12/2017 | Iagnemma | G01C 21/3461 |
| 2018/0050699 A1* | 2/2018 | Gauthier | B60W 30/18109 |
| 2018/0336424 A1* | 11/2018 | Jang | G06V 10/454 |
| 2019/0031174 A1* | 1/2019 | Adachi | B60W 30/181 |
| 2020/0026284 A1* | 1/2020 | Hiramatsu | G01C 21/36 |

FOREIGN PATENT DOCUMENTS

| | | |
|---|---|---|
| JP | 11-306498 A | 11/1999 |
| JP | 2006-316644 A | 11/2006 |
| JP | 2015-25439 A | 2/2015 |
| JP | 2017-45272 A | 3/2017 |
| WO | 2014/115309 A1 | 7/2014 |

\* cited by examiner

VEHICLE CONTROL METHOD AND CONTROL DEVICE

CROSS-REFERENCE TO RELATED APPLICATIONS

This application is a U.S. national stage application of International Application No. PCT/JP2017/043586, filed on Dec. 5, 2017.

BACKGROUND

Technical Field

The present invention relates to a control method and a control device for controlling a vehicle based on a color of an illuminated signal of a traffic light in a vehicle-advancing direction during travel in autonomous driving.

Background Information

Recently, there have been developments in techniques of controlling a vehicle based on information on a vehicle exterior (referred to below simply as exterior information) acquired using a camera or radar installed in the vehicle. For example, JP-A 2015-025439 discloses a technique of distinguishing a color of an illuminated signal of a traffic light in a vehicle-advancing direction from an image photographed by camera installed in the vehicle, and controlling the vehicle in accordance with the color of the illuminated signal.

SUMMARY

However, the technique of this document presumes that the traffic light can be photographed by the camera. Specifically, in situations in which the traffic light is not visible from a host vehicle for a reason such as, for example, a road being curved, the color of the illuminated signal of the traffic light cannot be assessed, and the control described in the document therefore cannot be executed.

In view of this, an object of the present invention is to minimize circumstances in which the color of an illuminated signal of a traffic light cannot be assessed in situations in which a traffic light in the vehicle-advancing direction is not visible from the host vehicle.

According to an aspect of the present invention, there is provided a vehicle control method in which an output of a drive source is controlled based on a color of an illuminated signal of a traffic light in a vehicle-advancing direction during travel in autonomous driving. In this vehicle control method, when the color of the illuminated signal of the traffic light in the vehicle-advancing direction cannot be acquired by an onboard camera, the color of the illuminated signal of the traffic light in the vehicle-advancing direction is estimated based on oncoming vehicle information and the output of the drive source is controlled based on an estimation result.

DETAILED DESCRIPTION OF THE EMBODIMENTS

An embodiment of the present invention is described below with reference to the drawings, etc. In the description below, the terms "red light" and "green light" mean, respectively, a circumstance of a color of an illuminated signal of a traffic light being red and a circumstance of the color being green.

Figure 1:
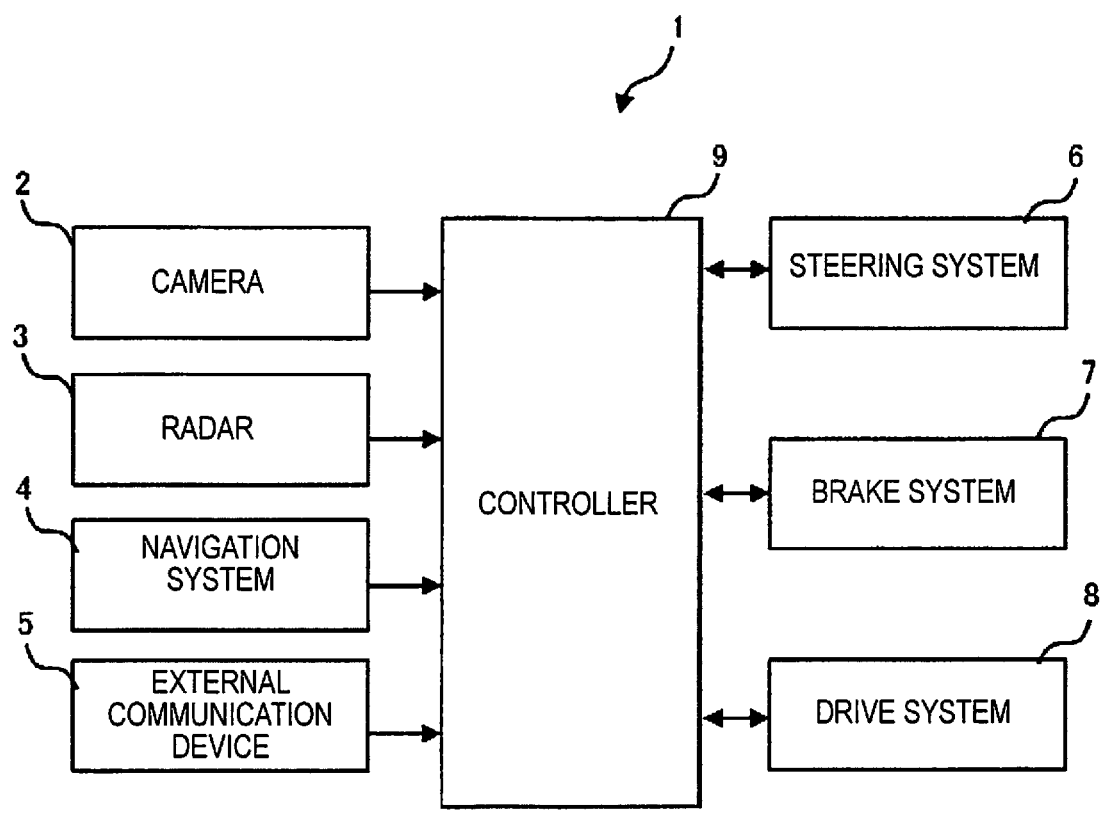
FIG. 1 is a block diagram of a configuration of a control system.

FIG. 1 is a block diagram of a configuration of a control system 1 for a vehicle. The control system 1 is provided with a camera 2, a radar 3, a navigation system 4, an external communication device 5, a steering system 6, a brake system 7, a drive system 8, and a control unit 9, and is installed in a vehicle.

The camera 2 photographs an area of a vehicle-advancing direction and outputs photographed image data to the control unit 9.

The radar 3 irradiates a periphery of a host vehicle with, for example, a laser or millimeter waves, and receives reflected waves thereof. The radar 3 is arranged at, for example, four corners of a body of the vehicle and at a front part of the body. The radar 3 calculates a distance to a physical object in the periphery of the host vehicle, a relative speed between the host vehicle and the physical object, a compass bearing of the physical object, etc., based on the received reflected waves, and outputs these data to the control unit 9.

The navigation system 4 is provided with a global positioning system (GPS) receiver that receives signals emitted from GPS satellites, and a map database that stores map information. The navigation system 4 recognizes a travel position of the host vehicle based on the received GPS signals and the map database. The navigation system 4 also sets a travel route to an inputted destination.

The external communication device 5 is a wireless communication device that performs vehicle-to-vehicle communication and/or road-vehicle communication and outputs received information to the control unit 9.

The control unit 9 reads information pertaining to the periphery of the host vehicle (referred to below also simply as "periphery information") obtained from the camera 2, the radar 3, the navigation system 4, and the external communication device 5, as well as information from various sensors (a vehicle speed sensor, a steering sensor, a brake sensor, an acceleration rate sensor, etc.) (not shown). The control unit 9 activates the steering system 6, the brake system 7, and the drive system 8 based on these pieces of information when performing autonomous driving.

The steering system 6 is configured including a torque sensor along with, for example, an electric power steering system, a steer-by-wire system, etc. The torque sensor detects torque exerted by a driver on a steering part. During manual driving in which the driver steers, the control unit 9 actuates a steering actuator based on a detection value of the torque sensor. When autonomous driving is executed, the control unit 9 actuates the steering actuator in accordance with a required steering angle established based on the periphery information.

The brake system 7 is configured including a brake actuator and a brake sensor. The brake sensor detects a depressed amount of a brake pedal. During manual driving, the control unit 9 actuates the brake actuator based on a detection value of the brake sensor. During autonomous driving, the control unit 9 actuates the brake actuator based on a required braking amount established based on the periphery information.

The drive system 8 is configured including an engine serving as a drive source, a throttle actuator, and an acceleration pedal sensor. The acceleration pedal sensor detects a depressed amount of an acceleration pedal. During manual driving, the control unit 9 actuates the throttle actuator based on a detection value of the acceleration pedal sensor. During autonomous driving, the control unit 9 actuates the throttle actuator based on a demanded output established based on the periphery information, etc.

Figure 2:
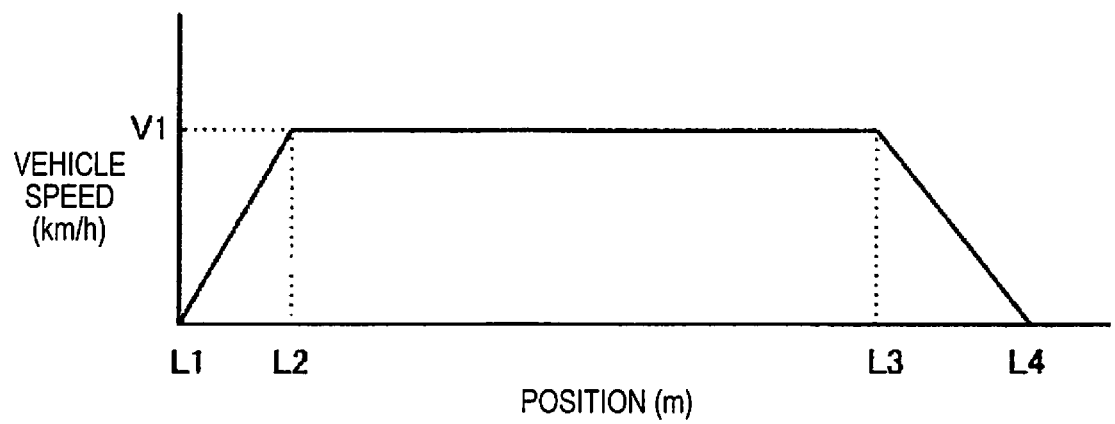
FIG. 2 is a graph for illustrating basic vehicle speed control of autonomous driving.

FIG. 2 is a graph for illustrating basic vehicle speed control (referred to below also as normal control) during autonomous driving. In FIG. 2, a position L1 is a starting point, a position L4 is a stopping point, and a vehicle speed V1 is a target vehicle speed. The target vehicle speed V1 is, for example, a legal speed limit of a road being traveled.

When the vehicle sets off after being stopped at the position L1, the control unit 9 establishes a demanded output and actuates the drive system 8 so that the vehicle accelerates at a predetermined target acceleration rate until reaching the target vehicle speed V1. The target acceleration rate is set in advance. When a vehicle is in front of the host vehicle, the target acceleration rate can be corrected so that the distance to the forward vehicle is maintained at or above a predetermined distance.

If the target vehicle speed V1 is reached at a position L2, the control unit 9 switches from accelerating travel to constant-speed travel at which the target vehicle speed V1 is maintained. The control unit 9 then starts deceleration at a position L3 calculated based on a current vehicle speed V1 and a target deceleration rate set in advance, so that the vehicle speed reaches zero (km/h) at the position L4.

In actual control, the vehicle decelerates ahead of a corner when there is a corner between the position L1 and the position L4, and control causing, inter alia, acceleration after passing through the corner is also performed.

Figure 3:
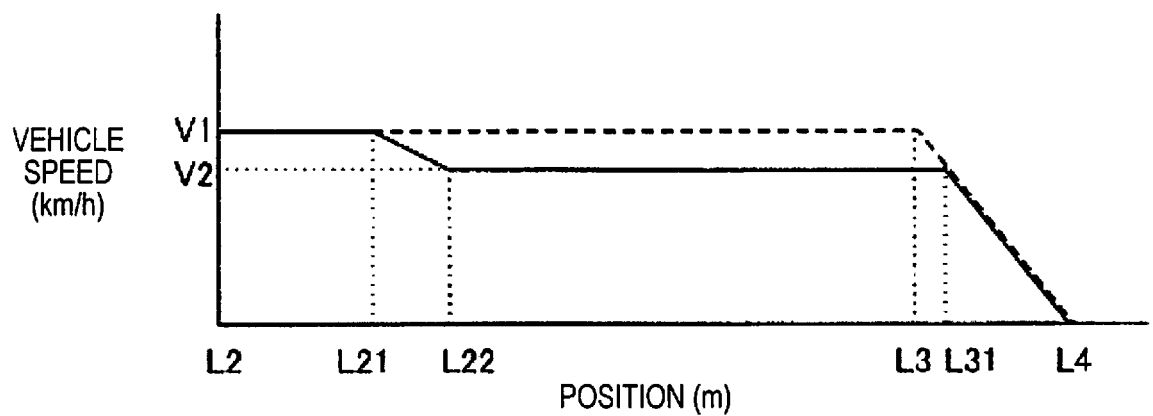
FIG. 3 is a graph for illustrating eco driving control.

FIG. 3 is a graph illustrating eco driving control, which is intended to further improve fuel efficiency beyond that of the normal control described above. FIG. 3 shows a transition of vehicle speed from constant-speed travel, omitting the time of reaching constant-speed travel after setting off. A solid line in the graph shows a case of eco driving control being performed, and a dashed line shows a case of normal control being performed. The points L2 to L4 in this graph correspond respectively to the points L2 to L4 in FIG. 2.

When the position L4 is a temporary stop line, the vehicle sets off immediately after stopping at the position L4, and normal control is therefore suitable. However, when the position L4 is a stop line for circumstances of stopping at a red light, the vehicle, after stopping at the position L4, remains stopped until the traffic light changes to green; therefore, a timing at which the position L4 is reached may be later than in normal control. In view of this, eco driving control, described below, is executed in order to reduce the amount of fuel consumed until the position L4 is reached.

Upon recognizing at a position L21 that the forward traffic light is a red light based on information from the camera 2, the navigation system 4, etc., the control unit 9 actuates the throttle actuator to reduce engine output and reduces the vehicle speed to a vehicle speed V2 having better fuel efficiency than the current vehicle speed V2. For example, if the vehicle speed V1 is 60 (km/h), the vehicle speed V2 is 50 (km/h). When the vehicle speed is reduced, the throttle valve may be fully opened. Fuel efficiency can be further improved by a "fuel cut function."

When the vehicle speed decreases to the vehicle speed V2 at a position L22, the control unit 9 performs constant-speed travel from that point onward. The control unit 9 then starts deceleration at the position L3 calculated based on the current vehicle speed V2 and the preset target deceleration rate so that the vehicle speed reaches zero (km/h) at the position L4.

Fuel efficiency improves due to the engine output being reduced as described above. When there is an uphill road between the position L22 and a position L31, the control unit 9 needs to increase the engine output in order to maintain the vehicle speed, but during eco driving control, the engine output is increased to a lesser degree in comparison to normal control. The eco driving control described above is merely one example. Examples other than eco driving control shall be described hereinafter.

Figure 4:
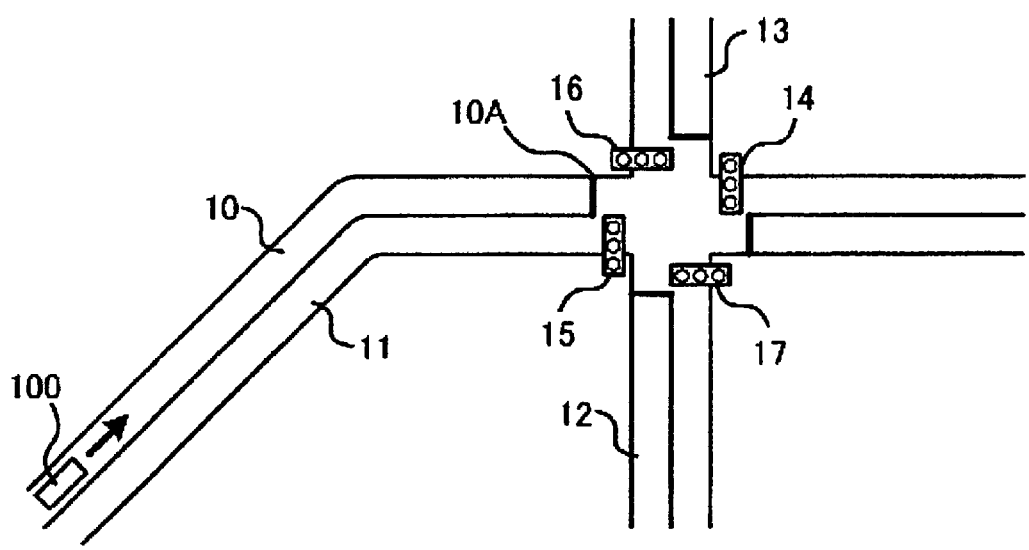
FIG. 4 is a drawing of an example of a situation in which a traffic light cannot be recognized from a host vehicle.

In the above description, it is presumed that the red light at the position L21 can be recognized from image data of the camera 2. However, when the vehicle is actually traveling on a road, there are circumstances in which the color of the illuminated signal of the traffic light cannot be acquired by the camera 2 until the vehicle nears the traffic light because the road is curved. For example, as shown in FIG. 4, a traffic light 14 of a lane 10 in which a host vehicle 100 is traveling cannot be seen past a curve. In this case, the control unit 9 cannot distinguish the color of the illuminated signal of the traffic light 14 until the traffic light 14 is within photographing range of the camera 2; therefore, even if the traffic light 14 is a red light when the host vehicle 100 has yet to reach the curve, the control unit 9 cannot start eco driving control until after the host vehicle has gone through the curve. Therefore, the effect of improving fuel efficiency through eco driving control is small.

In view of this, in the present embodiment, control described below is executed in order to enable eco driving control to be executed even when the camera 2 cannot acquire the color of the illuminated signal of the traffic light 14 of the lane 10 in which the host vehicle 100 is traveling.

Circumstances in which "the color of the illuminated signal of the traffic light cannot be acquired by the camera 2" are not limited to the situation shown in FIG. 4. For example, these circumstances include a large vehicle traveling in front of the host vehicle, the camera 2 photographing in backlit conditions, and the traffic light being beyond the crest of the hill when the host vehicle is traveling on an uphill road. Also included are circumstances in which the traffic light is within photographing range of the camera 2, but as a result of processing image data, the color of the illuminated signal of the traffic light cannot be distinguished.

Figure 5:
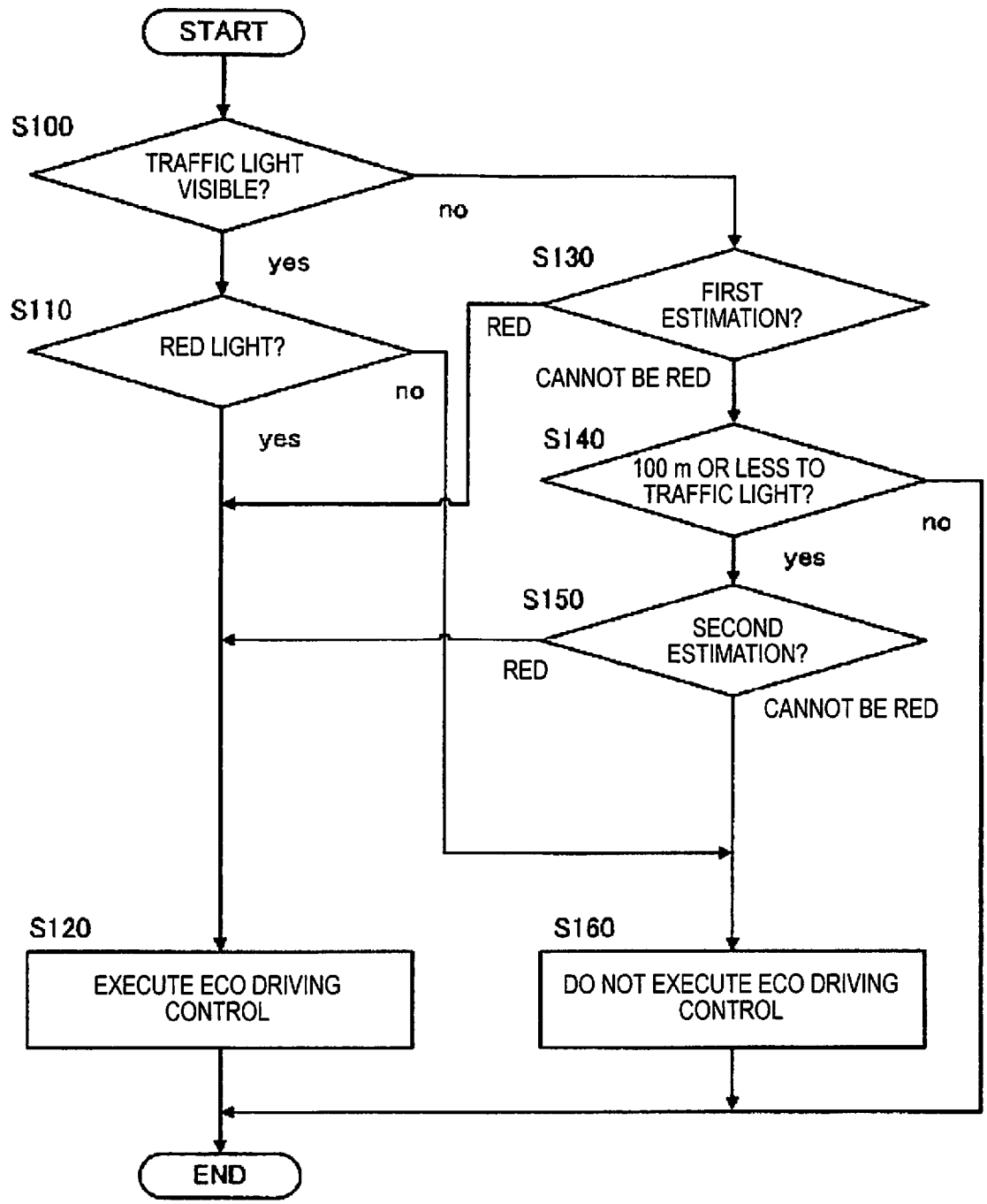
FIG. 5 is a flowchart of a control routine executed by a control unit.

FIG. 5 is a flowchart of a control routine, executed by the control unit 9, for establishing whether or not to execute eco driving control. This control routine is programmed into the control unit 9.

The control unit 9 starts the control routine of FIG. 5 at the timing at which the control unit perceives there is a traffic light ahead from the information acquired by the navigation system 4 and the external communication device 5 and the host vehicle has neared a position that is a predetermined distance to the traffic light. The control routine of FIG. 5 is repeatedly executed in a predetermined cycle. The predetermined distance is set to any value, e.g., about 500 (m), giving consideration to not imparting the driver with any sense of discomfort even if the engine output is reduced by eco driving control, to the extent by which fuel efficiency is improved by eco driving control, to the performance of the camera 2, etc.

In the control routine of FIG. 5, when the color of the illuminated signal of a traffic light ahead of the vehicle can be acquired by the camera 2, the control unit 9 determines whether or not to execute eco driving control based on the acquired color. When the color cannot be acquired, the control unit 9 estimates the color of the illuminated signal of the traffic light based on oncoming vehicle information and determines whether or not to execute eco driving control based on the estimation result. This process is described below according to the steps of the flowchart.

In step S100, the control unit 9 evaluates whether or not the color of the illuminated signal of the traffic light can be acquired by the camera 2. Specifically, when a traffic light can be extracted from image data photographed by the camera 2 and the color of the illuminated signal of the traffic light can be distinguished, the control unit 9 evaluates that the color of the traffic light can be acquired and executes the process of step S110. When a traffic light cannot be extracted from image data, or when a traffic light can be extracted but the color of the illuminated signal cannot be distinguished, the control unit evaluates that the color of the illuminated signal of the traffic light cannot be acquired and executes the process of step S130.

In step S110, the control unit 9 evaluates whether or not the acquired color of the illuminated signal of the traffic light is red, executes the process of step S120 if the color is red, and executes the process of step S160 if the color is not red.

In step S120, the control unit 9 executes the eco driving control described above.

In step S130, the control unit 9 performs a first estimation (described hereinafter), executes the process of step S120 when the traffic light is estimated to be red, and executes the process of step S140 when the traffic light is estimated to not be red.

The first estimation is an estimation of the color of the illuminated signal of the traffic light, performed based on the oncoming vehicle information. The first estimation shall be described in detail with reference to FIG. 4.

In the situation shown in FIG. 4, because the lane 10 in which the host vehicle 100 is traveling curves, the traffic light 14 of the lane 10 cannot be photographed by the camera 2 from the position of the host vehicle 100. The control unit 9 then estimates the color of the illuminated signal of the traffic light 14 based on the oncoming vehicle information, i.e., information pertaining to a vehicle traveling in an oncoming lane 11.

The basic idea of the first estimation is that after the host vehicle 100 and the oncoming vehicle traveling in the oncoming lane 11 at a substantially constant vehicle speed near the legal speed limit have passed each other, if no oncoming vehicle comes for at least a predetermined time, the traffic light 14 can be estimated to have changed from a green light to a red light. The basis of such a first estimation is as follows.

When an oncoming vehicle is traveling in the oncoming lane 11 at a substantially constant vehicle speed near the legal speed limit, it can be estimated that the oncoming vehicle has passed through the intersection without decelerating while a traffic light 15 of the oncoming lane 11 is green. After the host vehicle has passed by an oncoming vehicle that has passed through the intersection while the traffic light 15 is green, when no oncoming vehicle comes for at least the predetermined time, it can be estimated that the traffic light 15 has changed to red. The fact that the traffic light 15 of the oncoming lane 11 has changed from green to red means that the traffic light 14 of the lane 10 in which the host vehicle 100 is traveling also changes from green to red.

Next, a specific example of the first estimation shall be described.

Based on the information acquired by the camera 2 and the radar 3, the control unit 9 estimates the vehicle speeds, acceleration rates, and vehicle-to-vehicle distances of oncoming vehicles, and counts the number of oncoming vehicles that pass by the host vehicle 100. When the vehicle speed, acceleration rate, and vehicle-to-vehicle distance of an oncoming vehicle meet predetermined conditions and a predetermined time (e.g., about five seconds) has elapsed since the last oncoming vehicle was counted, the control unit 9 estimates that the traffic light 14 is red. The predetermined conditions in this case are, for example, if the road has a legal speed limit of 60 (km/h), the vehicle speed is the legal speed limit at 60 (km/h), the acceleration rate is approximately zero (m/s$^2$), and the vehicle-to-vehicle distance is 20 (m).

When there is only one oncoming vehicle, no assessment is made of whether or not the vehicle-to-vehicle distance meets the predetermined condition. The numerical values given as the predetermined conditions are merely one example; for example, the predetermined condition of the vehicle-to-vehicle distance may be set to a distance commensurately greater with respect to a higher legal speed limit.

When the vehicle speed, etc., of the oncoming vehicle does not meet the predetermined condition, the control unit 9 estimates that the traffic light 14 cannot be red. The traffic light is estimated to be red when not even one oncoming vehicle has passed through.

The description of the flowchart shall be resumed.

In step S140, the control unit 9 evaluates whether or not the distance to the traffic light 14 is 100 (m) or less; if the distance is 100 (m) or less, the control unit executes a second estimation in step S150, otherwise the control unit ends the current routine. The reason that the threshold value for this evaluation is 100 (m) is described hereinafter. Upon estimating in step S150 that the traffic light is red, the control unit 9 then executes eco driving control in step S120. Upon estimating in step S150 that the traffic light is not red, the control unit 9 determines to not execute eco driving control in step S160, i.e., to continue travel with normal control remaining in effect.

The second estimation is an estimation of the color of the illuminated signal of the traffic light based on the oncoming vehicle information, but the estimation method thereof differs from that of the first estimation.

The basic idea of the second estimation is that if the oncoming vehicle is accelerating at a vehicle speed lower than the legal speed limit, the traffic light 14 can be estimated to be red. The basis for such a second estimation is as follows.

When an oncoming vehicle is accelerating at a vehicle speed lower than the legal speed limit, it can be estimated that the oncoming vehicle either made a left turn and entered the oncoming lane 11 from a lane 12 intersecting the lane 10, or made a right turn and entered the oncoming lane 11 from a lane 13 intersecting the lane 10. This is because the oncoming vehicle sets off from a stopped state immediately after a traffic light 16 of the lane 12 and a traffic light 17 of the lane 13 change from red to green and the oncoming vehicle decelerates when passing through the intersection while both traffic lights 16, 17 remain green, and the oncoming vehicle therefore accelerates after entering the oncoming lane 11 in either case.

When an oncoming vehicle has entered the oncoming lane 11 from the lane 12 or the lane 13, it means that the traffic light 16 of the lane 12 and the traffic light 17 of the lane 13 are green and the traffic light 14 of the lane 10 in which the host vehicle 100 is traveling is red.

The threshold value for evaluation in step S140 described above is set to 100 (m) because at a point 100 (m) from the intersection, there is a high possibility that the oncoming vehicle, having decelerated in order to make a right or left turn, is currently accelerating to the legal speed limit. Specifically, the threshold value for evaluation in step S140 is preferably a distance at which there is a high possibility of the oncoming vehicle accelerating toward the legal speed limit after having decelerated in order to make a right or left turn, and is not necessarily limited to 100 (m). For example, the threshold value may be set to a shorter distance commensurately with respect to a lower legal speed limit.

Next, a specific example of the second estimation shall be described.

The control unit 9 estimates the vehicle speed, acceleration rate, and vehicle-to-vehicle distance of the oncoming vehicle based on the information acquired by the camera 2 and the radar 3. When the vehicle speed, acceleration rate, and vehicle-to-vehicle distance of the oncoming vehicle meet the predetermined conditions, the control unit 9 estimates that the traffic light 14 is red. The predetermined conditions in this case are, for example, if the legal speed limit is 60 (km/h), that the vehicle speed is lower than the legal speed limit by at least 10 (km/h), the acceleration rate is 10 (m/s$^2$) or greater, and the vehicle-to-vehicle distance is 10 (m) or less. The predetermined condition for vehicle-to-vehicle distance may be set to a shorter distance commensurately with respect to a lower legal speed limit. If the threshold value for evaluation used in step S140 is changed from 100 (m), the predetermined condition for acceleration rate may be set to a greater value commensurately with respect to a smaller threshold value.

As with the first estimation, the assessment of whether or not the vehicle-to-vehicle distance meets the predetermined condition is not made when there is only one oncoming vehicle. The numerical values given as the predetermined conditions are merely one example of numerical values at which the assessment can be made that the oncoming vehicle is not traveling at a constant vehicle speed near the legal speed limit; the numerical values are not necessarily limited to these examples.

When the aforementioned predetermined conditions are not met, the control unit 9 estimates that the traffic light 14 is not red. Circumstances of the predetermined conditions not being met include circumstances in which not even one oncoming vehicle passes through.

There are also sometimes circumstances in which an oncoming vehicle passing by the host vehicle 100 is accelerating even immediately after the traffic light 15 of the oncoming lane 11 has changed from red to green. In these circumstances, the oncoming vehicle is a vehicle that has stopped in the oncoming lane 11 because the traffic light 15 is red, but if the predetermined conditions are met, the control unit 9 estimates through the second estimation that the traffic light 14 is red and executes eco driving control. That is, regardless of the traffic light 14 changing from red to green, the control unit 9 estimates that the light is red. In other words, even when the control unit 9 estimates that the traffic light 14 cannot be red, the control unit 9 executes eco driving control when the light has been red up to that point.

However, performing control in this manner has no problems from the standpoint of fuel efficiency and safety. Specifically, immediately after the traffic light 14 changes to green, a forward vehicle that had been stopped at the stop line 10A will have just started to move; therefore, the host vehicle 100 will follow the forward vehicle while traveling under normal control and will need to decelerate. If the light is estimated to be red and eco driving control is executed, an appropriate vehicle-to-vehicle distance is maintained and fuel efficiency can be improved. When there is no forward vehicle, vehicle speed is decreased unnecessarily, but fuel efficiency does not necessarily worsen and there is no problem in terms of safety.

As described above, by executing the control routine shown in FIG. 5, an opportunity to execute eco driving control can be created even when the illuminated signal of the traffic light ahead in the advancing direction cannot be photographed by the camera 2.

A modification of the first estimation and the second estimation shall be described.

In the first estimation of the present embodiment, the vehicle speeds, acceleration rates, and vehicle-to-vehicle distances of oncoming vehicles and the number of oncoming vehicles passing by the host vehicle 100 are used as oncoming vehicle information, and the color of the illuminated signal is estimated based on this information, but this example is not provided by way of limitation. Any one element among the vehicle speeds, acceleration rates, vehicle-to-vehicle distances, and number of vehicles may alone be used as oncoming vehicle information, or any two or three may be used.

The same applies to the second estimation; any one or two elements among the vehicle speeds, acceleration rates, and vehicle-to-vehicle distances may be used as oncoming vehicle information.

Next, modifications of eco driving control shall be described.

Figure 6:
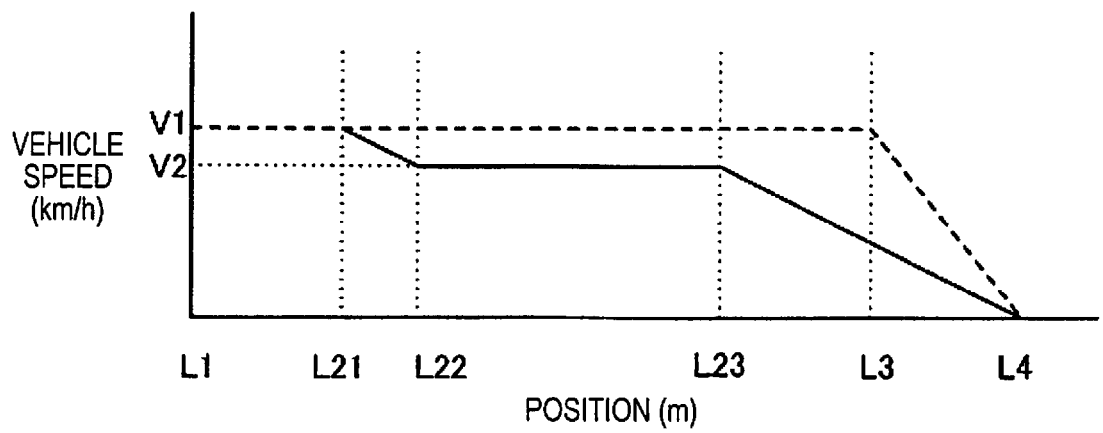
FIG. 6 is a graph for illustrating a first modification of eco driving control.

FIG. 6 is a graph for illustrating a first modification of eco driving control.

The act of reducing the vehicle speed to V2 by reducing the engine output at the position L22 is similar to FIG. 3 and is therefore not described here. In this modification, the target deceleration rate for stopping at the position L4 is set lower than in normal control. A deceleration starting position for stopping at the position L4 is thereby a position L23 ahead of the position L3, and fuel efficiency is therefore further improved beyond that of eco driving control illustrated in FIG. 3.

Figure 7:
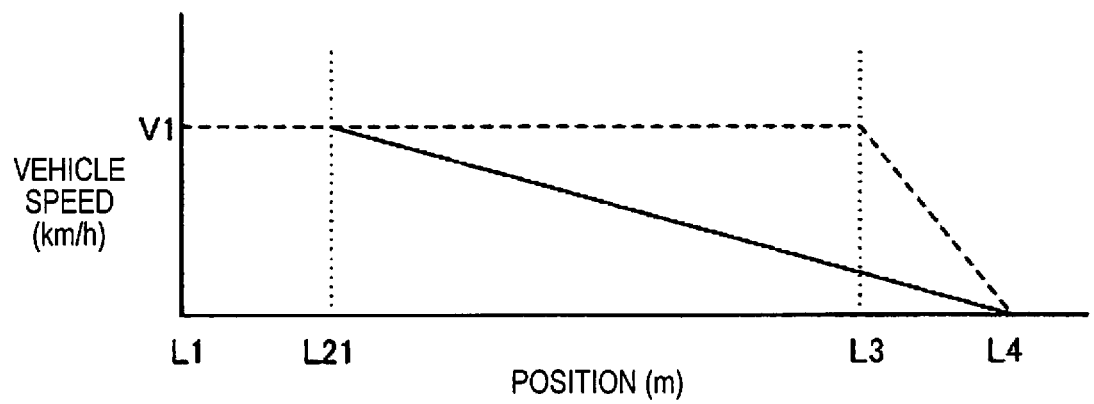
FIG. 7 is a graph for illustrating a second modification of eco driving control.

FIG. 7 is a graph for illustrating a second modification of eco driving control.

In the second modification, deceleration is immediately started when the control unit 9 estimates that the traffic light is red at the position L21. The second modification can be applied to circumstances in which the distance from the position where eco driving control is started to the position L4 which is the stopping position is comparatively short, such as circumstances in which, for example, the traffic light is estimated by the second estimation to be red at the position L21.

Next, a modification of the control routine of FIG. 5 shall be described.

Figure 8:
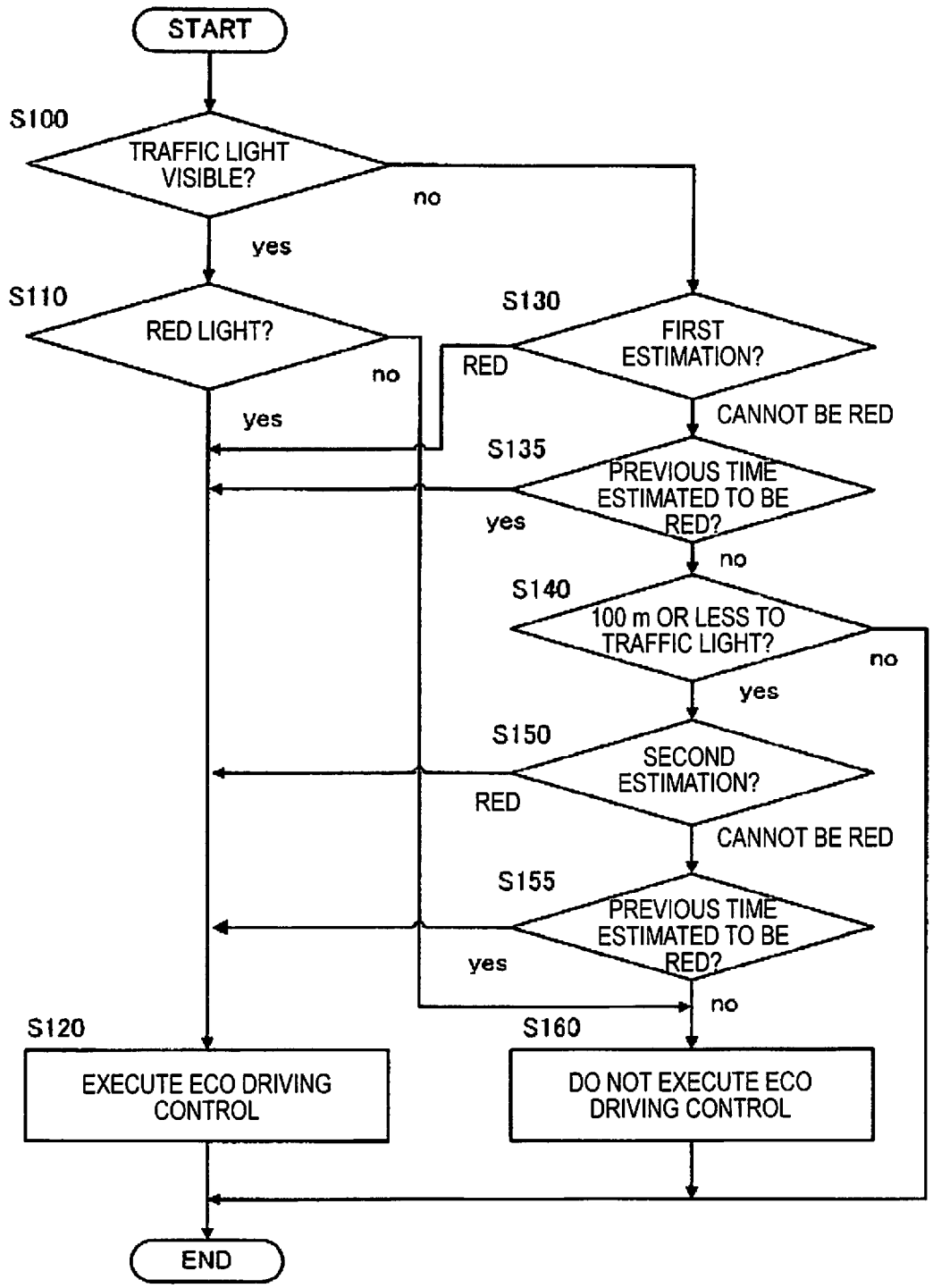
FIG. 8 is a modification of the control routine of FIG. 5.

FIG. 8 is a flowchart of the control routine of the modification. The difference with FIG. 5 is that a process (steps S135, S150) of evaluating whether or not the light was estimated to be red during the previous calculation is executed both after it was estimated in the first estimation in step S130 that the light cannot be red, and after it was estimated in the second estimation in step S150 that the light cannot be red. When the control unit 9 evaluates in steps S135 and S155 that the light was estimated to be red during the previous calculations, the control unit advances to step S120 and executes eco driving control. When the control unit 9 evaluates in steps S135 and S155 that it was estimated the light cannot be red even during the previous calculations, the control unit executes the processes of steps S140 and S160. The control unit 9 thereby executes eco driving control even when the traffic light 14 is green, if the change from red to green has just been made. Immediately after the traffic light 14 changes to green, there is a high possibility of there being a vehicle traveling at a low speed near the intersection, and when the host vehicle travels under normal control, the host vehicle must decelerate in accordance with that vehicle. According to the modification described above, the host vehicle can be prevented from getting too close to a forward vehicle because the vehicle speed is reduced by eco driving control, and fuel efficiency can be improved by eco driving control.

Next, the effects of the present embodiment shall be summarized.

In the present embodiment, the control unit 9 controls the output of the engine (drive source) based on the color of the illuminated signal of a traffic light in the vehicle-advancing direction while the vehicle is traveling in autonomous driving. At this time, when the camera 2 (onboard camera) is unable to acquire the color of the illuminated signal of the traffic light 14 in the vehicle-advancing direction, the control unit 9 estimates the color of the illuminated signal of the traffic light 14 in the vehicle-advancing direction based on the oncoming vehicle information, and performs eco driving control (limiting the output of the drive source) based on the estimation result. It is thereby possible, in situations in which the traffic light 14 in the vehicle-advancing direction is not visible from the host vehicle 100, to minimize instances in which the color of the illuminated signal of the traffic light 14 cannot be assessed. As a result, there are more opportunities to improve fuel efficiency.

In the present embodiment, the control unit 9 uses at least one element among the number, vehicle speeds, acceleration rates, and vehicle-to-vehicle distances of vehicles traveling in the oncoming lane as oncoming vehicle information. By using this information, the control unit can estimate the color of the illuminated signal of the traffic light 14 in situations in which the traffic light 14 in the vehicle-advancing direction is not visible from the host vehicle 100.

Circumstances in the present embodiment in which the camera 2 is unable to acquire the color of the illuminated signal of the traffic light 14 in the vehicle-advancing direction include not only circumstances of there being a curve that cannot be seen past in the road ahead, but also circumstances in which a large vehicle is traveling in front of the host vehicle, circumstances in which the camera 2 photographs in backlit conditions, circumstances in which the traffic light is beyond the crest of a hill during uphill travel, and circumstances in which the color of the illuminated signal of the traffic light cannot be evaluated from the image of the camera 2. It is thereby possible to adapt not only to circumstances in which there is a curve that cannot be seen past, but also to various situations in which the traffic light 14 in the vehicle-advancing direction is not visible from the host vehicle 100.

In the present embodiment, the control unit 9 performs eco driving control upon estimating that the color of the illuminated signal of the traffic light 14 in the vehicle-advancing direction is red, and does not perform eco driving control upon estimating that the color cannot be red. Fuel efficiency can thereby be improved by eco driving control even in situations in which the traffic light 14 in the vehicle-advancing direction is not visible from the host vehicle 100.

In the present embodiment, even when the control unit 9 estimates that the color of the illuminated signal of the traffic light 14 in the vehicle-advancing direction cannot be red, the control unit performs eco driving control when the light has just been red. Even if the traffic light 14 has been green, when the light has just been red, it is predicted that there will be a vehicle traveling at a low speed near the intersection, and when the host vehicle 100 is traveling under normal control, it is possible that the host vehicle will reduce speed in accordance with the other vehicle traveling at a low speed. According to the present embodiment, it is possible to travel without getting too close to a vehicle traveling at a low speed, and fuel efficiency can be improved.

An embodiment of the present invention was described above, but the above embodiment merely presents some applied examples of the present invention and is not intended to limit the technical range of the present invention to the specific configuration of the above embodiment.

The invention claimed is:

1. A vehicle control method for controlling an output of a drive source based on a color of an illuminated signal of a traffic light in a vehicle-advancing direction during travel in autonomous driving, the vehicle control method comprising: when the color of the illuminated signal of the traffic light in the vehicle-advancing direction is unable to be acquired by an onboard camera, the control method then estimates the color of the currently illuminated signal of the traffic light in the vehicle-advancing direction based on oncoming vehicle information; controlling the output of the drive source based on an estimation result; limiting the output of the drive source and reducing a vehicle speed from a current first vehicle speed to a constant vehicle speed at which fuel efficiency is superior to that at the first vehicle speed when the color of the illuminated signal of the traffic light in the vehicle-advancing direction is estimated to be red, after initiation of deceleration of the vehicle at a first deceleration position; when the vehicle begins to decelerate, performing a constant-speed travel to maintain the constant vehicle speed; and initiating further deceleration of the vehicle at a second deceleration position that is calculated based on the constant vehicle speed and a preset target deceleration rate, and continuing to decelerate at the preset target deceleration rate until the vehicle reaches a stopping point.

2. The vehicle control method according to claim 1, wherein
the oncoming vehicle information includes at least one of a vehicle speed, an acceleration rate, a vehicle-to-vehicle distance, and a number of vehicles traveling in an oncoming lane.

3. The vehicle control method according to claim 1, wherein
circumstances in which the color of the illuminated signal of the traffic light in the vehicle-advancing direction is unable to be acquired by the onboard camera include circumstances in which there is a curve in a road that is unable to be seen past the curve, circumstances in which a large vehicle is traveling in front, circumstances in which the onboard camera photographs in backlit conditions, circumstances in which the traffic light is beyond a crest of a hill during uphill travel, and circumstances in which the color of the illuminated signal of the traffic light is unable to be evaluated from an image captured by the onboard camera.

4. The vehicle control method according to claim 1, wherein
the output of the drive source is not limited upon estimating that the color of the illuminated signal of the traffic light in the vehicle-advancing direction is not red.

5. The vehicle control method according to claim 4, wherein
even upon estimating the color of the illuminated signal of the traffic light in the vehicle-advancing direction is not red, the output of the drive source is limited when the color has just been red.

6. A vehicle control device comprising: an onboard camera that photographs an area ahead of a vehicle; and a controller that controls an output of a drive source based on a color of an illuminated signal of a traffic light in a vehicle-advancing direction during travel in autonomous driving, wherein the controller estimates the color of the illuminated signal of the traffic light in the vehicle-advancing direction based on oncoming vehicle information and controls the output of the drive source based on an estimation result after determining that the color of the illuminated signal of the traffic light in the vehicle-advancing direction is unable to be acquired by the onboard camera, and the controller limits the output of the drive source and reduces a vehicle speed from a current first vehicle speed to a constant vehicle speed at which fuel efficiency is superior to that at the first vehicle speed when the color of the illuminated signal of the traffic light in the vehicle-advancing direction is estimated to be red, after initiation of deceleration of the vehicle at a first deceleration position, when the vehicle begins to decelerate, the controller performing a constant-speed travel to maintain the constant vehicle speed, the controller initiating further decelerating the vehicle at a second deceleration position that is calculated based on the constant vehicle speed and a preset target deceleration rate, and continuing to decelerate at the preset target deceleration rate until the vehicle reaches a stopping point.

* * * * *